(12) United States Patent
Yarema et al.

(10) Patent No.: US 12,403,857 B2
(45) Date of Patent: Sep. 2, 2025

(54) ACCESSIBLE DELIVERY STORAGE AND ANTI-ENTRAPMENT FEATURE FOR AN ELECTRIC VEHICLE FRONT TRUNK

(71) Applicant: FCA US LLC, Auburn Hills, MI (US)

(72) Inventors: Dennis J Yarema, Richmond, MI (US); Madelyn R Yarema, Richmond, MI (US)

(73) Assignee: FCA US LLC, Auburn Hills, MI (US)

( * ) Notice: Subject to any disclaimer, the term of this patent is extended or adjusted under 35 U.S.C. 154(b) by 134 days.

(21) Appl. No.: 18/514,122

(22) Filed: Nov. 20, 2023

(65) Prior Publication Data

US 2025/0162530 A1    May 22, 2025

(51) Int. Cl.
*G08B 21/00*    (2006.01)
*B60R 21/015*    (2006.01)
*B60R 21/01*    (2006.01)

(52) U.S. Cl.
CPC ............ *B60R 21/015* (2013.01); *B60R 2021/01006* (2013.01); *B60R 2021/0104* (2013.01)

(58) Field of Classification Search
CPC ........ B60R 21/015; B60R 2021/01006; B60R 2021/0104

USPC ...................................... 340/425.5
See application file for complete search history.

(56) References Cited

U.S. PATENT DOCUMENTS

| | | | |
|---|---|---|---|
| 2002/0109588 A1* | 8/2002 | Faye | E05B 83/26 340/425.5 |
| 2003/0102688 A1* | 6/2003 | Bingle | G08B 21/22 296/76 |
| 2009/0027188 A1* | 1/2009 | Saban | B60N 2/268 340/439 |
| 2020/0181954 A1* | 6/2020 | Hwang | B62D 25/12 |

FOREIGN PATENT DOCUMENTS

WO    WO-2018025273 A1 *    2/2018

* cited by examiner

*Primary Examiner* — Mark S Rushing
(74) *Attorney, Agent, or Firm* — Jeremy J. Klobucar (57) ABSTRACT

A system and method include a first device and a vehicle in communication with the first device. The vehicle includes a front trunk, a camera disposed within the front trunk; and a vehicle controller controlling the camera to capture an image for the front trunk and communicating the image in an image signal to the first device.

15 Claims, 9 Drawing Sheets

ACCESSIBLE DELIVERY STORAGE AND ANTI-ENTRAPMENT FEATURE FOR AN ELECTRIC VEHICLE FRONT TRUNK

FIELD

The present disclosure relates generally to electric vehicles and, more particularly, to an electric vehicle having a remotely accessible front trunk (frunk) to prevent entrapment and allow storage for deliveries.

BACKGROUND

This section provides background information related to the present disclosure which is not necessarily prior art.

Electric vehicles typically have a front trunk (frunk) to take the place of the engine compartment. The front trunk is used to secure cargo. The front trunk space of a vehicle can be used to conceal an entrapped human. Reducing the likelihood of a human within the front trunk is desirable. Package delivery services desire more flexible in convenient ways to allow the customers to receive packages. It would be desirable to incorporate the use of the vehicle in the delivery process.

SUMMARY

This section provides a general summary of the disclosure and is not a comprehensive disclosure of its full scope or all of its features.

The present system incorporates a camera into the front trunk of the vehicle to allow anti human trafficking and enable the front trunk to be used as a delivery locker for a package delivery service.

In one aspect of the disclosure, a system includes a first device and a vehicle in communication with the first device. The vehicle includes a front trunk, a camera disposed within the front trunk; and a vehicle controller controlling the camera to capture an image for the front trunk and communicating the image in an image signal to the first device.

In another aspect of the disclosure, a method of controlling a vehicle having a front trunk includes directing a camera to within the front trunk, controlling the camera to capture an image for the front trunk and communicating the image signal to a first device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
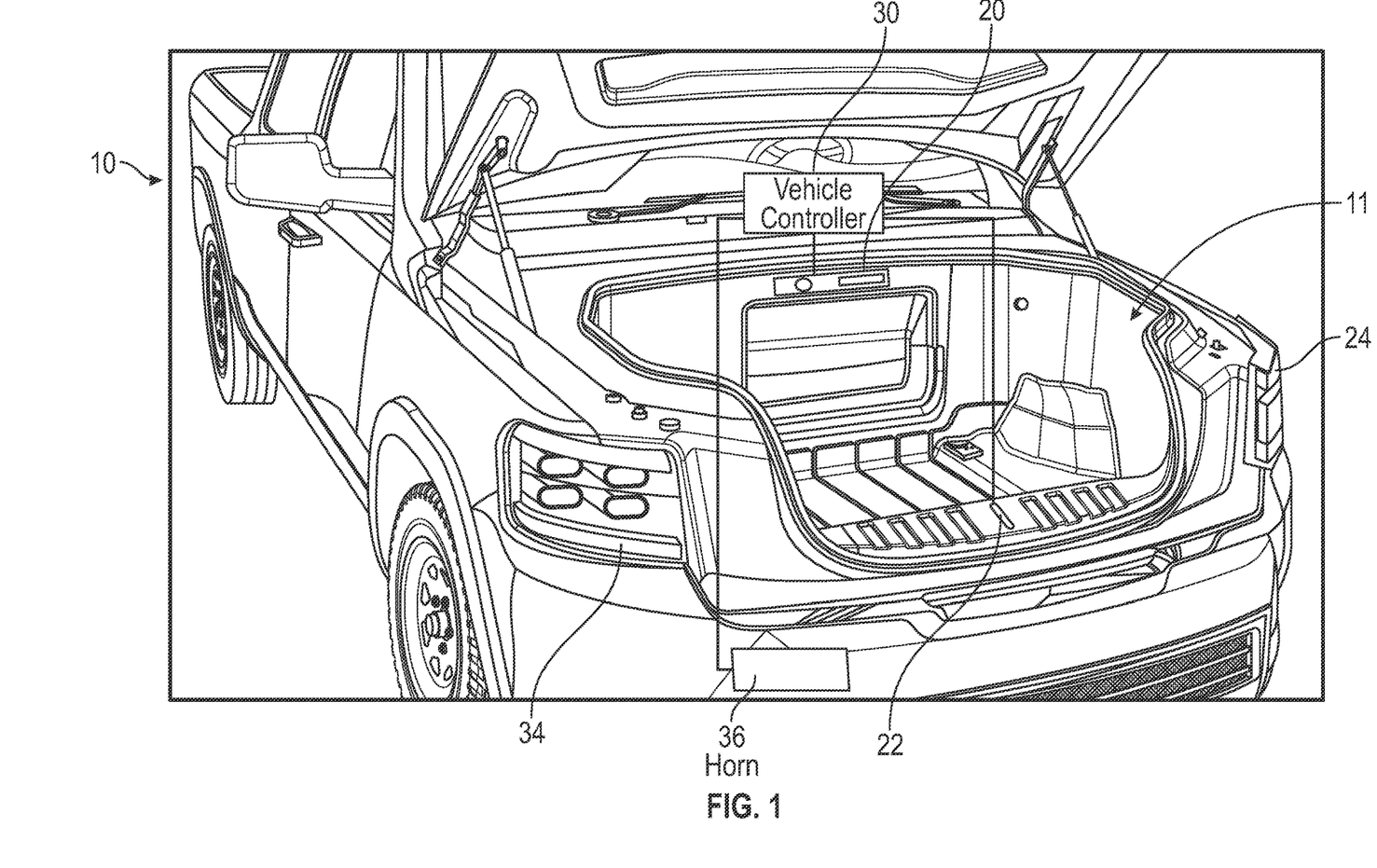
FIG. 1 is a perspective view of a vehicle having a front trunk (frunk) with the monitoring system therein.

Referring now to FIG. 1, a vehicle 10 having a cargo area 11 such as a front trunk 12 (frunk) is illustrated. A front trunk 12 is provided in many battery electric vehicles. The front trunk 12 is enclosed with a hood 14. The front trunk 12 also has sidewalls 16 and a load floor 18. The load floor 18 is typically planar and is used to support objects referred to as the load of the vehicle.

The load floor 18, the sidewalls 16 and the hood 14 form an enclosure for the cargo area 11 that is sealed from the external elements of the vehicle and therefore makes a desirable location for delivery service to deliver a package. Likewise, the cargo area 11 may also be large enough to fit a human.

A camera assembly 20 is disposed having a view of the cargo area 11 within the vehicle. The camera assembly 20 is described in further detail in FIG. 2.

A latch 22 is used to secure the hood to the vehicle 10 in a closed position. The latch 22 may have a latch actuator which is controlled by a vehicle controller 30. The vehicle controller 30 may be microprocessor-based and, although represented as one, may comprise a plurality of processors programmed to perform various functions. The vehicle controller 30 may be in communication with the camera assembly 20 and the latch 22 and perform various functions such as unlatching the latch and making control decisions based upon inputs from the camera assembly 20.

The vehicle 10 may also include lights 34 represented by headlights and a horn 36, both of which are controlled by the vehicle controller 30. The lights 34 are headlights that are activated (flashed) during certain operations described below. In other examples various other lights may be used for signaling alone, or in combination with, the headlights or other lights. Taillights, marker lights, turn signals fog lights are all examples of other lights. The horn 36 may likewise be activated briefly for signaling purposes.

Figure 2:
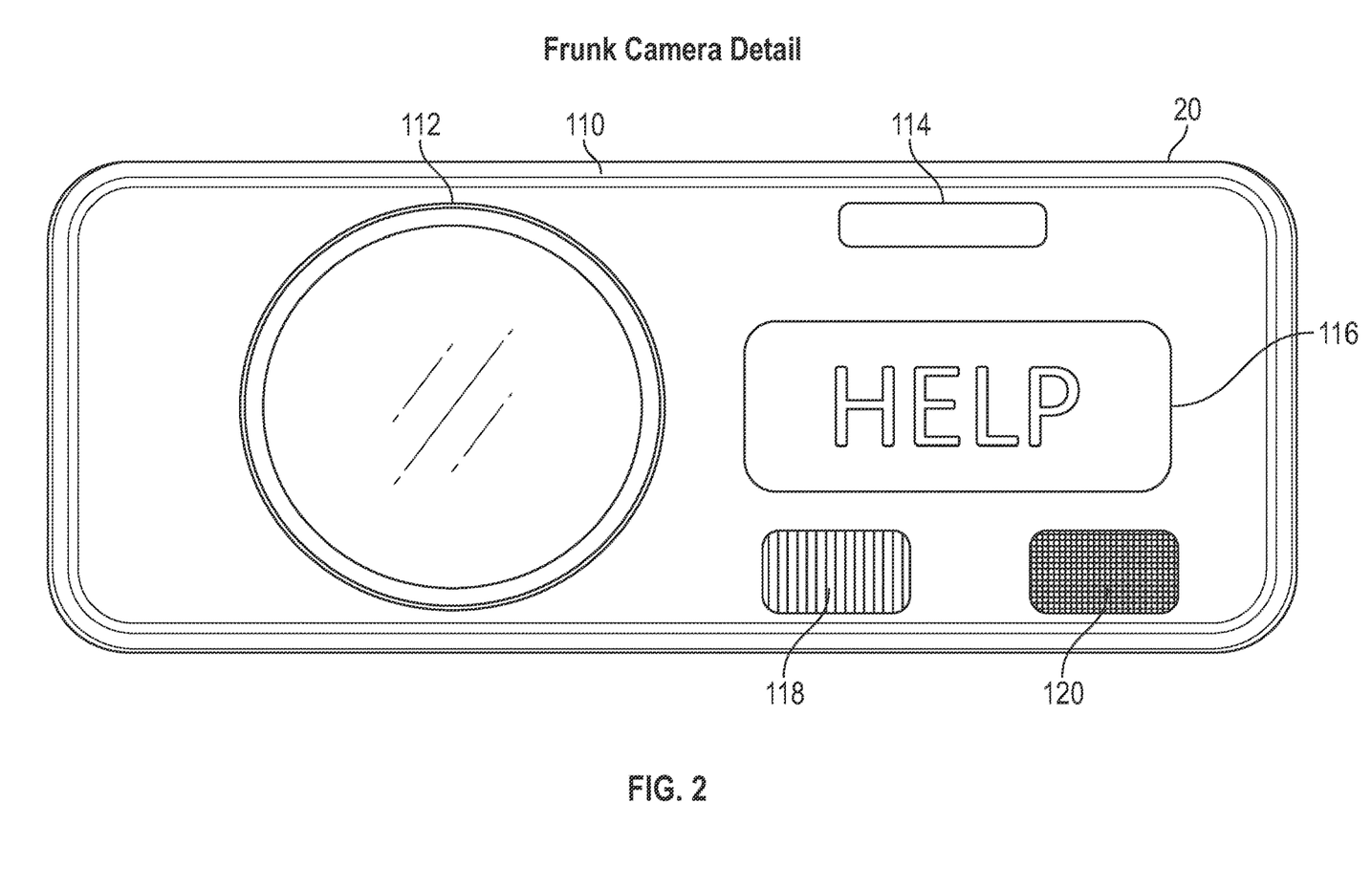
FIG. 2 is a front view of a camera assembly for use with the monitoring system of FIG. 1.

Referring now to FIG. 2, the camera assembly 20 is illustrated in further detail. In this example, the camera assembly has a plurality of integrated components integrated within a housing 110. However, although the camera assembly components are illustrated in one housing 110, discrete components can also be used.

The camera assembly 20 has a camera 112 that has a viewing angle directed into the cargo area 11 of the vehicle 10. The camera 112 is used to form electronic images from within the cargo area 11. The camera 112 is capable of taking both still images and sequential images such as in a movie.

The camera assembly 20 may also include an indicator light 114 to provide an indicator to the operator of various functions as described below.

The camera assembly 20 may also include a help button 116. The help button 116 may be activated and used to trigger a help signal to be communicated to the vehicle controller 30 so that help for a person trapped within the front trunk 12 may be assisted. In response to the help signal the vehicle controller may unlatch a front trunk latch. Details of this are provided below.

The camera assembly 20 also includes a microphone 118 and a speaker 120. The microphone 118 and the speaker 120 are used to communicate with a person located within the cargo area 11. The microphone 118 communicates electrical microphone signals to the vehicle controller 30. The vehicle controller 30 may communicate audible signals to the speaker 120. The signals to and from the microphone 118 and the speaker 120 may be communicated from the vehicle or from an emergency controller or remote controller as described later in FIG. 3.

Figure 3:
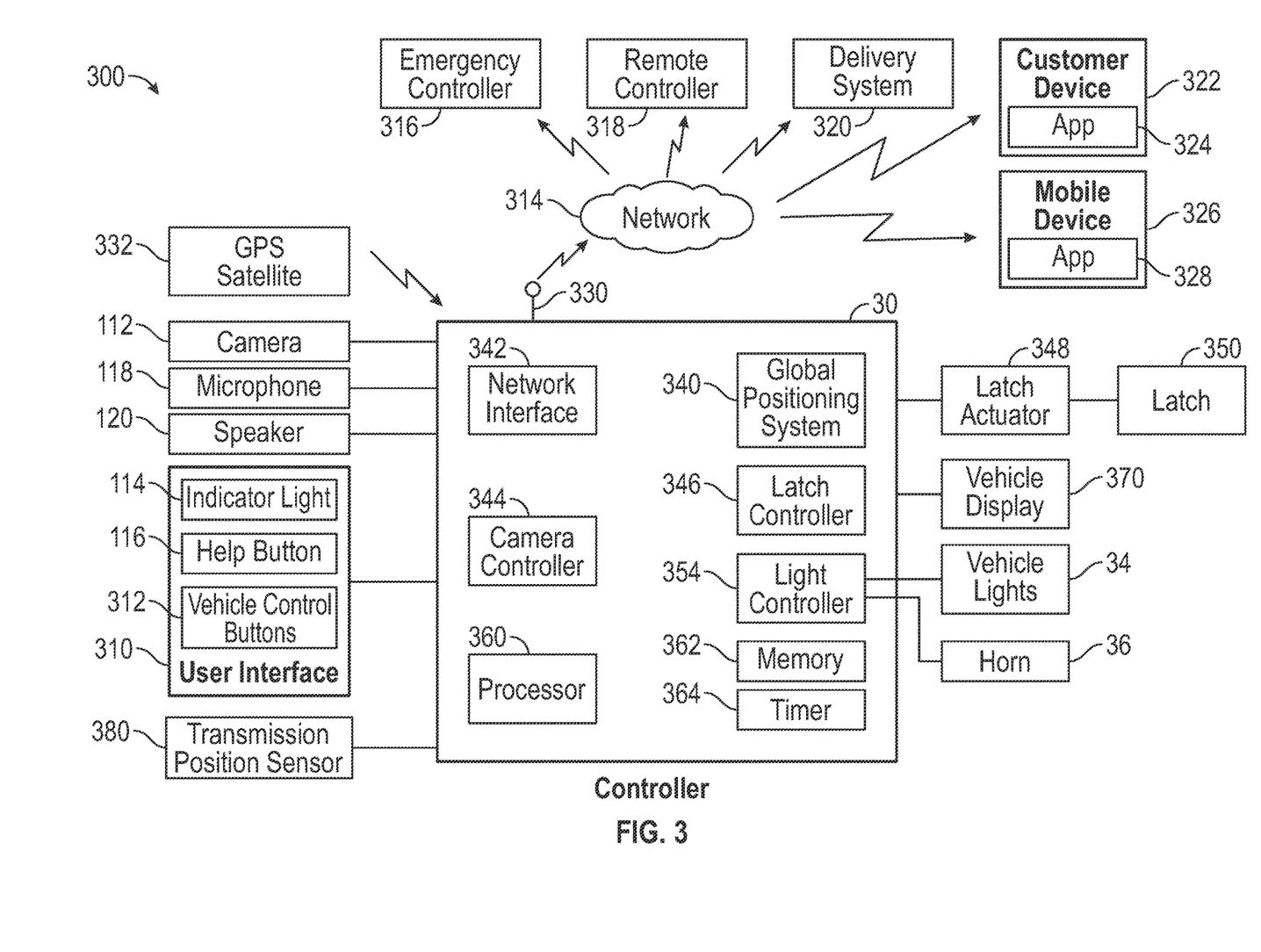
FIG. 3 is a block diagrammatic view of the control system for use in FIG. 1.

Referring now to FIG. 3, details of the vehicle controller 30 and the control system 300, its inputs and outputs, are set forth in further detail.

The camera 112, the microphone 118, the speaker 120 and a user interface 310 are in communication with the vehicle controller 30. The user interface 310 may include the indicator light 114 and the help button 116 described above. The user interface 310 also can include vehicle control buttons 312. The vehicle control buttons 312 may be located within the frunk 12 may also be distributed within the passenger compartment of the vehicle 10 so that the vehicle 10 operator may provide inputs to the vehicle controller 30.

The vehicle controller 30 is in communication with a network 314 such as a wireless network. The network 314 is in communication with an emergency controller 316, a remote controller 318 and a delivery system 320. The emergency controller 316 may provide emergency services such as emergency services for contacting and dispatching law enforcement. The remote controller 318 may be a centralized controller that is used to communicate through the network 314 to the control module or to the emergency controller 316. The remote controller 318 may be operated by the manufacturer of the vehicle 10 or a third party. The delivery system 320 is also in communication with the network 314. The network 314 may interconnect the emergency controller 316, the remote controller 318 and the delivery system 320.

The network 314 is also in communication with a customer device 322 that has an (application) app 324 associated therewith. A mobile device, having an app 328, is also in communication with the network 314. The customer device 322 and the mobile device 326 together with the apps 324, 328 may also intercommunicate with the emergency controller 316, the remote controller 318 and the delivery system 320.

The customer device 322 corresponds to the device associated with the vehicle 10 and therefore the controller module 30 of a particular vehicle. The customer device 322, in one example, is a mobile phone. However, other types of customer devices may be used. The mobile device 326 represents various types of devices used by various entities. For example, the mobile device 326, in one example, is a mobile device associated with a neighbor or friend that wishes to gain access to the front trunk 12 of the vehicle 10. A delivery driver may wish to access the front trunk 12 to place a package therein. A friend or neighbor may desire to access the trunk to obtain or borrow a tool or other implement with the permission of the vehicle operator.

The vehicle controller 30 has an antenna 330 for communicating with the network 314. The antenna 330 may also communicate with a global positioning system (GPS) satellite 332. The antenna 330 may therefore receive position signals at a global positioning system 340 disposed within the control module. The global positioning system 340 may allow the customer device 322, the mobile device 326, the emergency controller 316, the remote controller 318 and the delivery system 320 to obtain the position of the vehicle by receiving a position signal.

A network interface 342 provides an interface to communicate between the devices 316-326 and the network 314.

A camera controller 344 is used to control the operation of the camera 112. The camera controller 344 may also control the microphone 118 and the speaker 120.

A latch controller 346 is used to control a latch actuator 348 which is used to unlatch the latch 350. The latch actuator 348, in one example, is a motor or solenoid used to unlatch the latch 350 to allow the front trunk to open.

A light controller 354 is used to control the lights 34 of the vehicle 10. For example, the light controller 354 may flash for a delivery driver attempting to deliver a package to the front trunk 12.

A processor 360 is programmed to perform various control functions as described in greater detail below. The processor 360 is in communication with a memory 362 and a timer 364. The memory 362 is used to store thresholds, pictures and video by way of example. The timer 364 times various functions. A vehicle display 370 is also controlled by the processor 360. The vehicle display 370 includes a touch screen or indicator light to indicate the presence of a person or the presence of a package stored within the front trunk 12.

A transmission positioning sensor 380 provides an electrical signal corresponding to the position of the transmission. In the present example, the transmission signal may indicate whether the transmission is in park or not in park by generating a park signal.

Figure 4A:
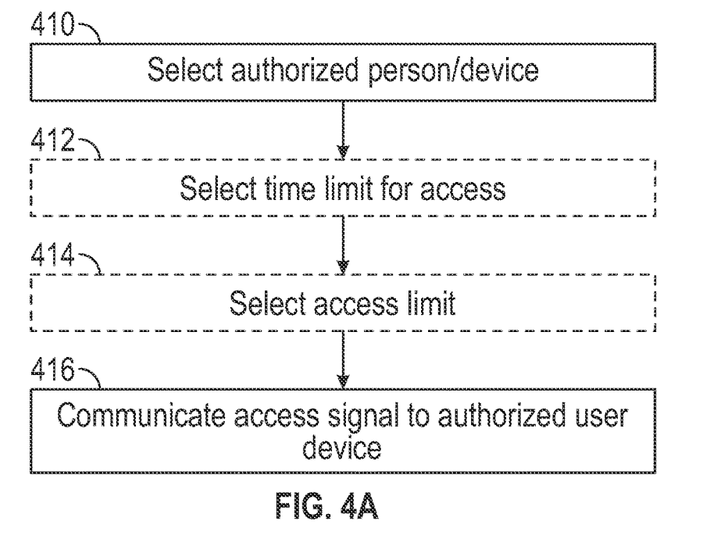
FIG. 4A is a flowchart of a method for authorizing a user.

Referring now to FIG. 4A, steps associated with authorizing another to access the front trunk are set forth. The method sent forth in FIG. 4A corresponds to when a vehicle owner wants to allow another person such as a friend or relative to pick up something left within the front trunk. For example, if Friend A wants to lend Friend B tools for the weekend and will not be home in person for the exchange, Friend A may place the tools in the frunk and allow access to Friend B to use the code to access the front trunk.

To enable this, step 410 allows the Friend A to select an authorized person, such as Friend B, from a mobile app. The mobile app may have a list of preauthorized users or allows Friend A to enter identifying information such as a telephone number for accessing a text or notification and providing a code thereto. Likewise, an email may also be used to notify Friend B they have access to the frunk of Friend A. In step 412, a time limit for access by Friend B may be provided. For example, a date and time window that allows one time access may be provided. That is, in combination with step 414, an access limit may be set. One time access, two time access or unlimited access may be provided. In the above example with respect to tools, two accesses may be provided for Friend B. The friend may be allowed to take out the tools and may be allowed to replace the tools back when they are done by enabling two access. Of course, setting a time limit for access in step 412 and an access limit 414 in step 414 are optional. In step 416, the enablement of the access (an access signal) is communicated to the user device for Friend B through the network 314 as described above. The remote controller 318 may receive the instructions from the customer device 322 from steps 410-414 and provide an access signal to the mobile device 326. Examples of screen displays are provided below.

Figure 4B:
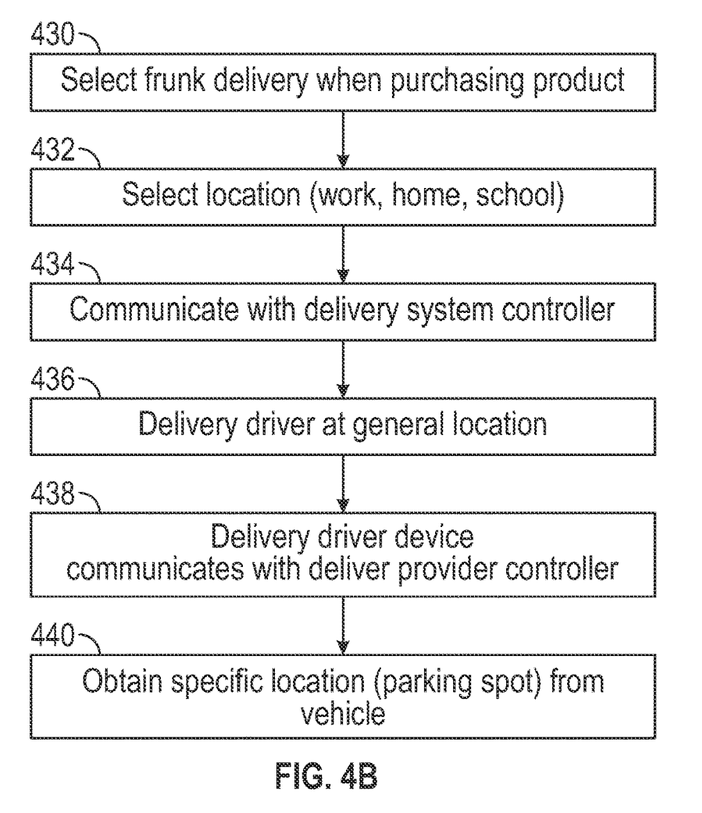
FIG. 4B is a flowchart of a method for authorizing a friend to access the frunk.

Referring now to FIG. 4B, the system is also useful for delivering products to a consumer and using the frunk as a storage locker. In step 430, the delivery type may be selected by the owner of the vehicle 10 through the use of the customer device 322 using the app 324. A delivery signal is generated Frunk delivery may be selected and other choices such as the vehicle location 432 may be selected in step 432 and included as part of the delivery signal. The vehicle location 432 may be a general location, such as work, home or school. The high-level or general location will allow the delivery system 320 to schedule an appropriate location. That is, the delivery system 320 may receive the frunk delivery request signal and allow the user to select an address or location for delivery because often times the delivery time is more than a day or two away. The specific parking spot or location is determined on the delivery day.

In step 434, communication with the delivery system controller 320 is provided. An access signal allowing others to access the vehicle is communicated. The delivery system schedules a delivery for a particular day. Of course, a confirmation of the location of the vehicle 10 closer to the actual delivery time may be communicated through the network 314 to the customer device 322. In step 436, the delivery driver may be directed to the general location, such as the work, school or home that the vehicle for receiving the delivery is located. The delivery driver may communicate from the mobile device 326 through the network 314 to the delivery system 320. The delivery system 320 may communicate with the remote controller 318 and to the vehicle controller 30 to find a more detailed location using the GPS satellite. In step 440, the specific location such as parking spot may be achieved by communicating the location signal through the network 314 to the mobile device 326 directly or by way of the remote controller of the delivery system 320.

Figure 5:
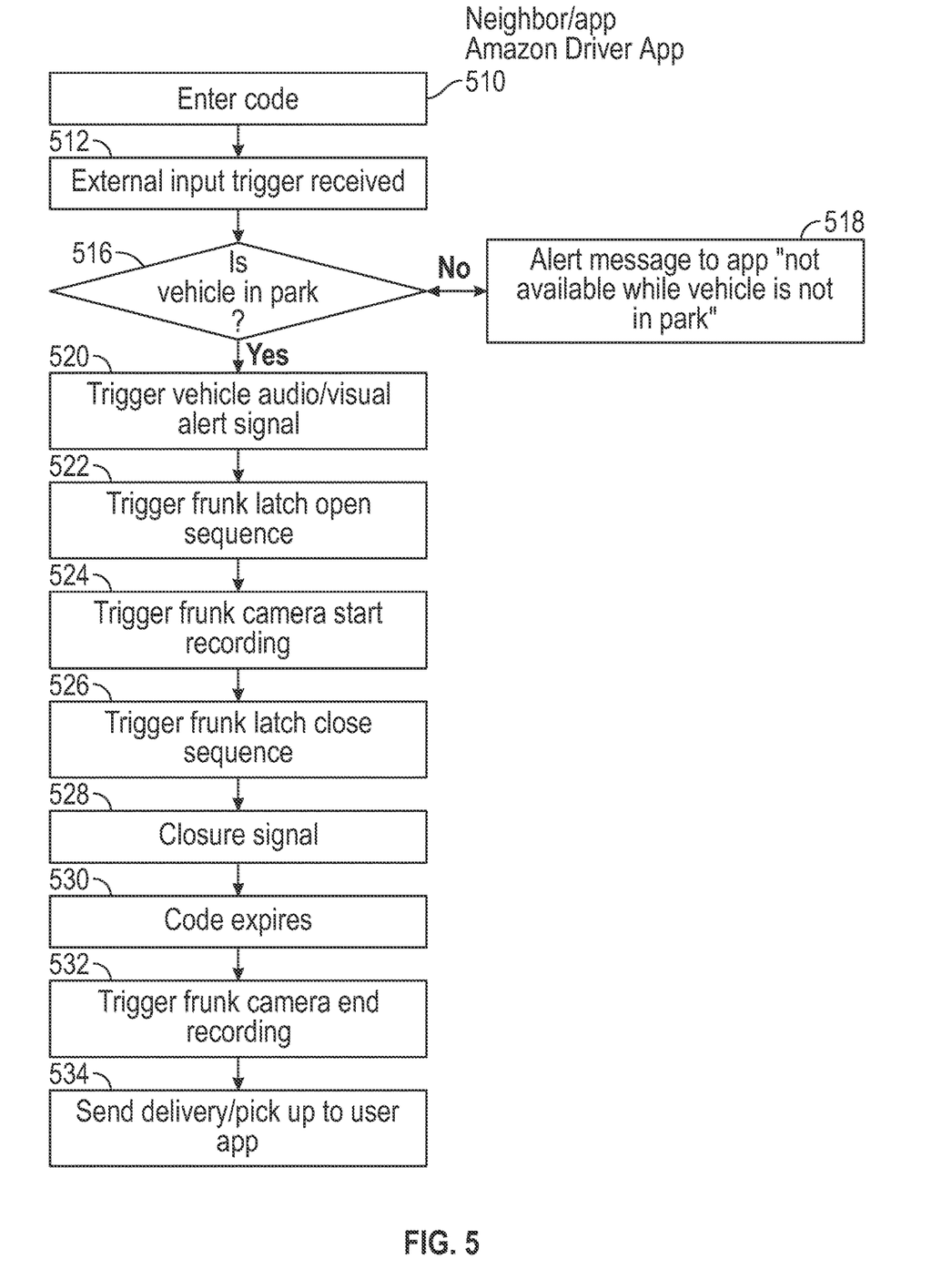
FIG. 5 is a continuation of both FIGS. 4A and 4B to allow a delivery person or another person to access the front.

Referring now to FIG. 5, after step 416 and after step 440, access to the front trunk is provided through the system. In step 510, Friend B or the delivery driver may receive a code to enter into the application 328 of the mobile device 326. The code may be communicated to the remote controller 318 from the mobile device directly or through the delivery that commands the latch actuator to unlatch the latch 350 using a front trunk unlatch signal. The latch controller 346 may therefore control the latch actuator 348 based upon the entering of the code in step 510 and as commanded by the remote controller 318. An external input trigger is therefore received at step 512 from the remote controller 318. In step 516, it is determined whether the vehicle is in park. In some situations, the vehicle may be occupied or driving or about to be driven. Therefore, a check whether the vehicle is in park is performed in step 516 using the transmission position sensor 380. If the vehicle is not in park in step 516, step 518 generates an alert communicated to the customer device 322, the mobile device or both that access is not available while the vehicle is not in park.

After step 516, step 520 is performed when the vehicle is in park. In step 520, a vehicle audio signal using the horn 36 or visual alert signal using the lights 34 (or both) may be provided. As mentioned above, the vehicle lights 34 may be quickly illuminated or the horn 36 may be chirped or both to indicate the location of the vehicle. In step 522, the frunk latch open sequence may be provided. That is, the latch controller 346 may receive an unlatch control signal from the remote controller 318 in response to a code being entered from the mobile device 326. The unlatch control signal received at the vehicle controller 30 and the latch actuator 348 releases the latch 350. As the frunk is opened, step 524 triggers the camera 112, which is directed to within the frunk, to record an image or a video of the interior or cargo space within the frunk. The controller initiates the capture of the image. The image signal with the image is communicated to a first device such as the vehicle controller, the remote controller or the emergency controller or combinations thereof.

Thereafter, a button may be pushed to close the frunk in step 526. Likewise, the frunk may also be closed manually. In either situation, the frunk may be locked after being closed by the latch controller 346 controlling the latch actuator 348 to lock the latch 350 by generating a latch signal. Thereafter, a signal may be communicated to the remote controller 318 that the frunk has been closed. That is, in step 528, a closure signal may be communicated to the remote controller 318. The remote controller 318 may then allow the code to expire in step 538. The code may expire when the predetermined number of accesses has been allowed by the vehicle owner. Of course, this is an optional step since unlimited access may be allowed.

In step 532, once the latch sequence is initiated, the frunk camera recording or storing of images may be ended. In step 534, a successful delivery message or a reminder to pick up the package may be communicated to the customer device 322 by way of a text, notification or email.

Figure 6A:
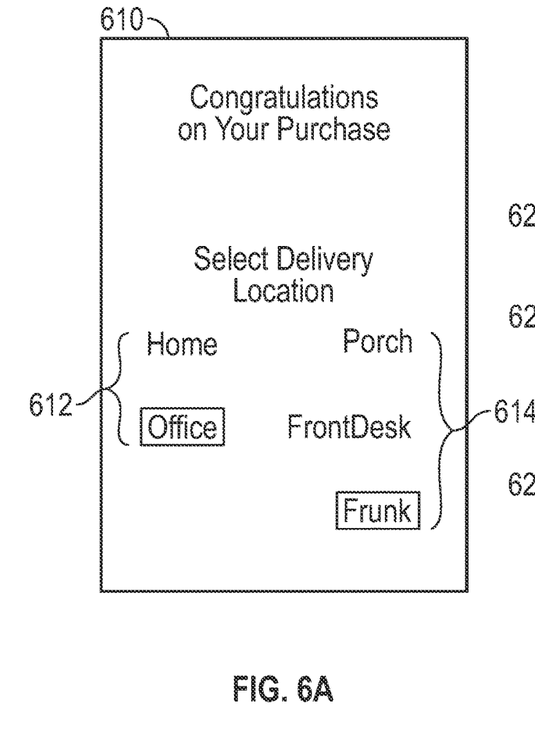
FIG. 6A is a screen display for a user device to allow delivery to a particular location such as a frunk.

Referring now to FIG. 6A, a screen 610 is illustrated for an example of allowing the frunk to be used as a delivery mechanism (a front trunk delivery). General delivery selections 612 are provided. Specifically, the present example provides "home" or "office" as a general delivery area. The home or office location may be stored within the delivery system from prior use or entered upon use for the present delivery. Specific selections 614 are also provided for the location. That is, the specific delivery locations in this example are porch, front desk and frunk. Of course, other locations may be provided. In this example, the frunk is the selection selected as the specific location 614. The screen display 610 is an example of a screen display displayed by the customer device 322.

Figure 6B:
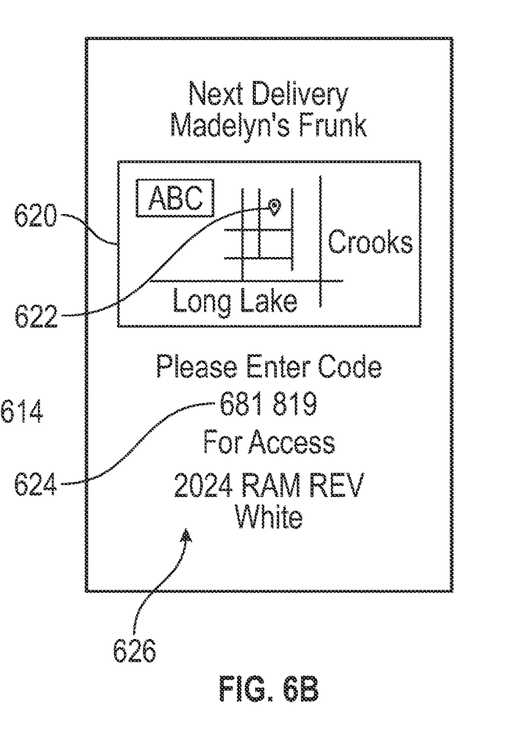
FIG. 6B is a screen display for a delivery driver to locate the front.

Referring now to FIG. 6B, a screen display for the delivery driver using the mobile device 326 and the app 328 is set forth. In this example, a map 620 may be displayed with a specific location 622 thereon. The specific location 622 may be a parking lot and may be down to the exact parking spot. When the delivery vehicle or mobile device 326 is closed, the code 624 may be entered for access to the vehicle. The vehicle description displays 626 may provide a general description of the vehicle 10. When the code is provided, the signal may be communicated from the remote controller 318 to the vehicle controller 30 so that the latch controller 346 unlatches the latch 350 by the latch actuator 348. Likewise, the light controller 354 may control the lights 24 and the horn 36 to alert the driver as to the specific location of the vehicle.

Figure 7A:
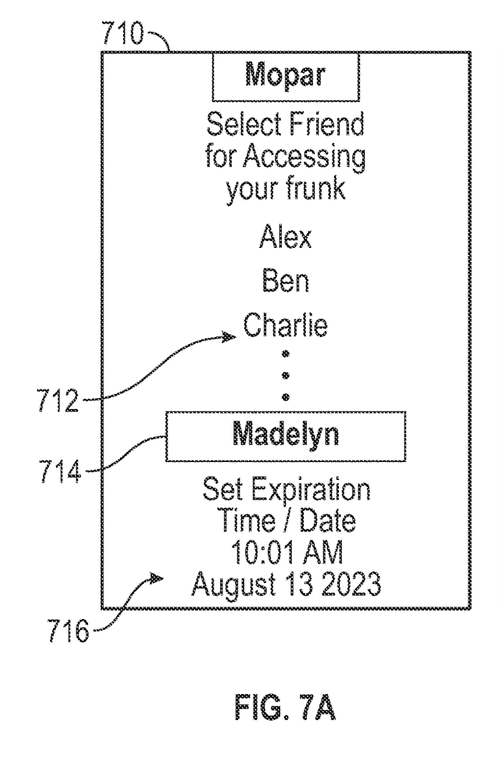
FIG. 7A is a screen display for an app for selecting a friend to access the frunk.

Referring now to FIG. 7A, as mentioned above, the system may also be used for allowing a friend to access your frunk. An example of a screen display 710 for selecting a friend for access. In this example, a list 712 may be accessed from an address book or a list stored within the app 324 of the customer device 322. The list 712 includes Alex, Ben, Charlie and Madelyn. The screen display 710 is displayed at the customer device 322 and to allow a selection box 714 to be moved and for making a selection within the list 712. In this example, the selection box 714 is provided at the person "Madelyn". Also, an access limit area 716 may also be provided. The access limit area may allow the operator to set an access time and limit for the access. In this example, Aug. 13, 2023, at 10:01 a.m. is the expiration time for the access for Madelyn.

Figure 7B:
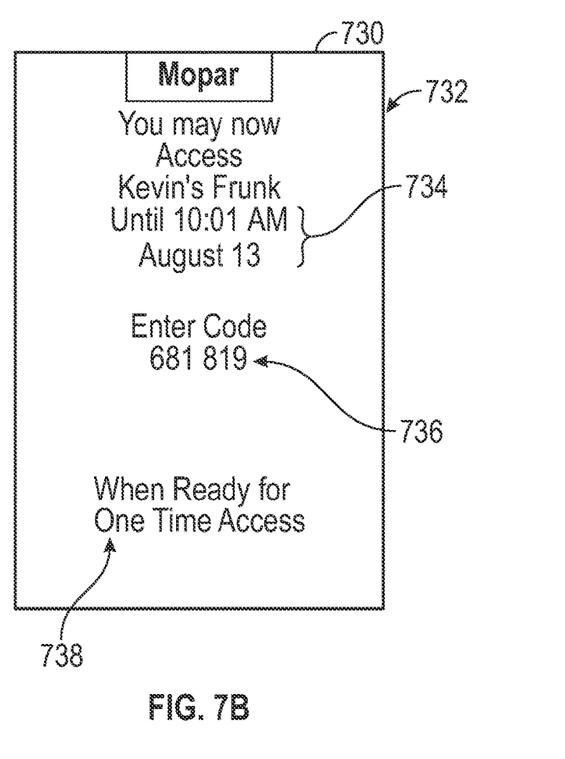
FIG. 7B is a screen display for a friend to access the frunk.

Referring now to FIG. 7B, a screen display 730 is illustrated. The screen display 730 is illustrated for the mobile device 326. The screen display 730 may have a message that includes a message 732 for whose trunk, an access limit message 734 for the access limit allowable and a code display 736 for displaying the code. The number of accesses may be displayed at the access number 738.

Figure 8:
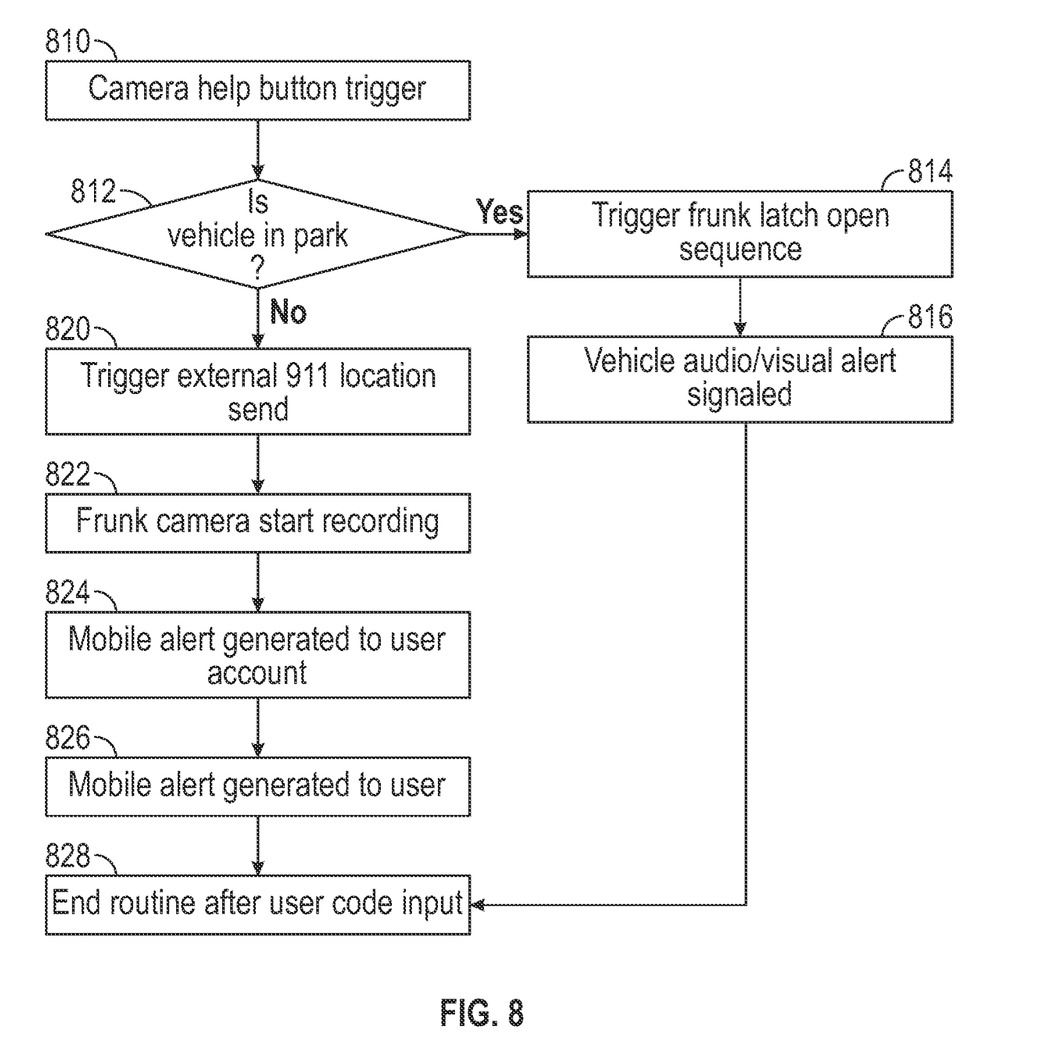
FIG. 8 is a flowchart of a method for enabling someone trapped within the vehicle to be removed.

Referring now to FIG. 8, preventing the entrapment of a person within the front trunk may also be performed. In step 810, the help button 116, from FIG. 2, may be triggered when a person is within the vehicle frunk. The help button 116 generates a help signal communicated to the vehicle controller 30. In step 812, if the vehicle is in park, a front latch open sequence may be performed to allow the person within the frunk to be removed in step 814. To unlatch the latch, the help signal from the help button 116 may be communicated to the remote controller 318 which, in turn, communicates with the latch controller 346 through the network 314 to allow the latch actuator 348 to release the latch 350. Of course, the remote controller 318 may not be involved and therefore the processor 360 may control the opening of the latch 350. After step 814, step 816 generates an audio alert or a video alert through the horn 36 or the vehicle lights 34. In a similar manner, the customer device 322 may generate a screen display corresponding to the successful opening of the front trunk.

Referring back to step 812, when the vehicle is not in park, step 820 generates an external emergency signal such as a signal to the emergency controller 316 using the 911 emergency location system in the United States or Canada. That is, when the help button is depressed and the vehicle is in park, as indicated by the transmission position sensor 380, a position signal with the position of the vehicle as indicated by the global position system 340 may be communicated to the emergency controller 316 along with the help signal to allow emergency services to be deployed or dispatched to the vehicle location. This may be done directly or by the remote controller receiving the help signal and communicating the help signal to the emergency controller. After step 820, step 822 in response to the help signal, the camera 112 may be triggered to take one or more still pictures or trigger the recording of video from the cargo area within the frunk. The video or pictures may be stored in the memory 362 and/or transmitted to the emergency controller 316. Likewise, the video may also be accessible by the customer device 322 and communicated thereto.

In step 824, a mobile alert may be generated by the remote controller 318 and communicated to the customer device 322. This will allow the customer device to be notified. As mentioned above, the video and/or still pictures may also be communicated. A mobile alert is communicated to the customer device in step 822. After step 826 and 816, a user code may be entered in step 828 to end the recording and after the person is removed from the front trunk.

Figure 9:
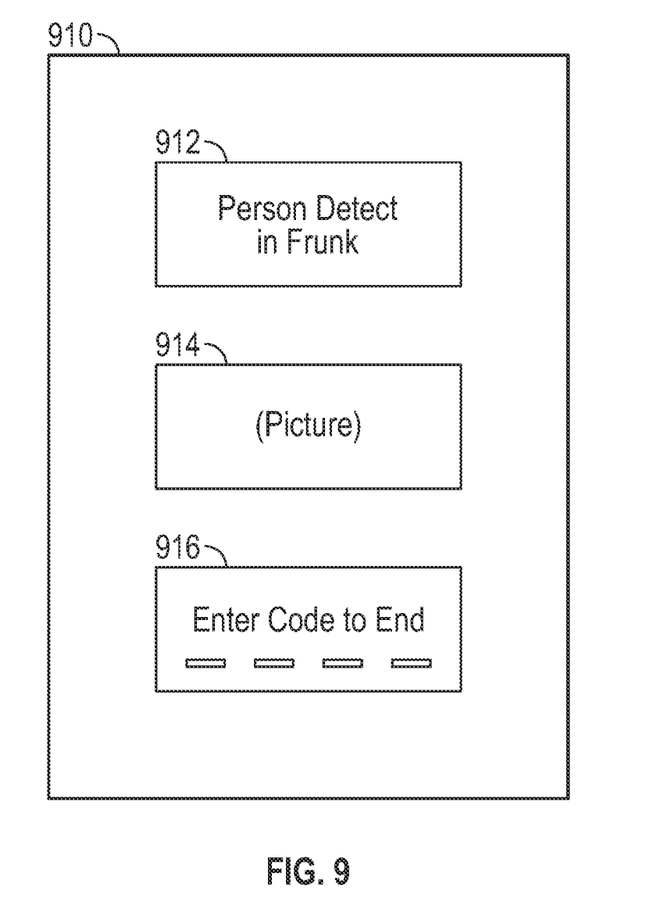
FIG. 9 is a screen display displayed at the customer device to allow a warning that a person was detected in the frunk displaying a picture and displaying a code to cease the warning when the threat has been removed.

Referring now to FIG. 9, a screen display 910 is illustrated that generates a warning message 912 indicating a person is detected in the front trunk of the vehicle associated with the owner. A picture 914 of the scene may also be displayed. That is, a picture of the cargo area of the frunk may be displayed. A code entry display 916 may be generated to end the monitoring of the front trunk by entering a code. This is particularly useful to end the monitoring after the person has been removed from the front trunk. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a first device; a vehicle in communication with the first device; and
a remote controller in communication with the first device and the vehicle,
wherein the vehicle includes a front trunk; a camera disposed within the front trunk; and a vehicle controller controlling the camera to capture an image for the front trunk and communicating the image in an image signal to the first device,
wherein the first device comprises a user device, wherein the user device generates an access signal that is communicated to the remote controller to allow access to the front trunk; and
the remote controller is configured to communicate a code to a mobile device in response to the access signal that permits access to the front trunk; and
the remote controller communicates an unlatch control signal to the vehicle controller in response to receiving confirmation of the code from the mobile device, and the vehicle controller controls a front trunk unlatch signal to unlatch the front trunk.

2. The system of claim 1, further comprising a help button disposed within the trunk, said help button generating a help signal and communicating the help signal to the vehicle controller coupled to the camera and triggered to generate the image signal in response to the help signal.

3. The system of claim 2, further comprising an emergency controller receiving the help signal from the vehicle controller and for dispatching help in response to the help signal.

4. The system of claim 3, further comprising a positioning system generating a position signal for the vehicle and wherein the position signal is communicated to the emergency controller in response to the help signal.

5. The system of claim 2, wherein the vehicle further comprises a latch and wherein the latch is unlatched by the vehicle controller in response to the help signal.

6. The system of claim 2, wherein the vehicle further comprises a latch and wherein the latch is unlatched by the vehicle controller in response to the help signal and a park signal indicating the vehicle is in park.

7. The system of claim 1, wherein the remote controller is a delivery system, the access signal comprises a delivery signal, and the user device communicates the delivery signal to the delivery system corresponding to a front trunk delivery and a vehicle location.

8. The system of claim 7, wherein the delivery system communicates the code to the mobile device.

9. The system of claim 1, wherein the code expires after the unlatch control signal is communicated.

10. A method of controlling a vehicle having a front trunk comprising:
communicating a code to a mobile device from a remote controller in response to an access signal;
communicating an unlatch control signal to a vehicle controller in response to receiving the code from the mobile device, and controlling a front trunk unlatch signal to unlatch the front trunk using the vehicle controller;
directing a camera positioned within the front trunk;
controlling the camera to capture an image for the front trunk; and
communicating the image signal to a first device.

11. The method of claim 10 further comprising generating a help signal and communicating the help signal to the vehicle controller coupled to the camera and generating the image signal in response to the help signal.

12. The method of claim 11 further comprising receiving the help signal from the vehicle controller at an emergency controller and dispatching help in response to the help signal.

13. The method of claim 12 further comprising generating a position signal for the vehicle at a positioning system and communicating the position signal to the emergency controller in response to the help signal.

14. The method of claim 11 further comprising unlatching a latch by the vehicle controller in response to the help signal.

15. The method of claim 11 further comprising unlatching a latch by the vehicle controller in response to the help signal and a park signal indicating the vehicle is in park.

* * * * *